(12) United States Patent
Felth et al.

(10) Patent No.: US 8,874,818 B2
(45) Date of Patent: Oct. 28, 2014

(54) SAFETY ARRANGEMENT (75) Inventors: Lars-Magnus Felth, Fjärås (SE); Ingvar Gillholm, Kungsbacka (SE)

(73) Assignee: ABB AB (SE)

( * ) Notice: Subject to any disclaimer, the term of this patent is extended or adjusted under 35 U.S.C. 154(b) by 202 days.

(21) Appl. No.: 13/428,779

(22) Filed: Mar. 23, 2012

(65) Prior Publication Data

US 2012/0239838 A1    Sep. 20, 2012

Related U.S. Application Data

(63) Continuation of application No. PCT/EP2010/068002, filed on Nov. 23, 2010.

(30) Foreign Application Priority Data

Sep. 23, 2009    (SE) ........................................ 0950696

(51) Int. Cl.
*G06F 13/14*    (2006.01)
*G05B 9/02*    (2006.01)

(52) U.S. Cl.
CPC ........................................ *G05B 9/02* (2013.01)
USPC ........................................ 710/305; 340/5.64

(58) Field of Classification Search
CPC .................. G07C 9/00309; G07C 2009/00396; B60R 25/246
USPC ........................ 710/305; 340/5.62, 5.64, 5.72
See application file for complete search history.

(56) References Cited

U.S. PATENT DOCUMENTS

| | | | | |
|---|---|---|---|---|
| 3,945,006 | A * | 3/1976 | Cleeton | 342/45 |
| 5,798,711 | A * | 8/1998 | Issa et al. | 340/5.26 |
| 6,397,286 | B1 * | 5/2002 | Chatenever et al. | 710/302 |
| 6,708,881 | B2 * | 3/2004 | Hartmann | 235/454 |
| 6,911,898 | B2 * | 6/2005 | Chung | 340/5.64 |
| 7,264,149 | B2 * | 9/2007 | Hartmann et al. | 235/375 |
| 7,279,807 | B2 * | 10/2007 | Konno | 307/10.5 |
| 7,457,669 | B2 * | 11/2008 | Katoozi et al. | 607/60 |
| 7,548,153 | B2 * | 6/2009 | Gravelle et al. | 340/10.3 |
| 7,555,353 | B2 * | 6/2009 | Teranishi et al. | 700/3 |
| 7,624,219 | B2 * | 11/2009 | Fuessl et al. | 710/305 |

(Continued)

FOREIGN PATENT DOCUMENTS

DE    10200091 A1    7/2003
DE    102005059012 A1    6/2007

OTHER PUBLICATIONS

Almedia, Luis. Safety-Critical Automotive Systems: New Developments in CAN. 2006.*

(Continued)

*Primary Examiner* — Matthew D Spittle
(74) *Attorney, Agent, or Firm* — St. Onge Steward Johnston & Reens LLC (57) ABSTRACT

A monitoring system including a first and a second portion. The first portion includes a controller for receiving a code sequence. The first portion is configured to connect the system to a common data bus. The first portion is configured to provide a synchronization signal to the second portion when the two portions are in a predetermined position. The second portion includes a controller for providing the code sequence to the first portion and the first portion being further configured to output the code sequence for verification by a verification entity.

16 Claims, 6 Drawing Sheets

(56) References Cited

U.S. PATENT DOCUMENTS

| | | | |
|---|---|---|---|
| 7,626,488 B2* | 12/2009 | Armstrong et al. | 340/10.2 |
| 7,719,280 B2* | 5/2010 | Lagae et al. | 324/322 |
| 7,768,981 B1* | 8/2010 | Donovan et al. | 370/338 |
| 7,893,840 B2* | 2/2011 | Volpi et al. | 340/572.4 |
| 8,018,345 B2* | 9/2011 | Xiang et al. | 340/572.6 |
| 8,115,600 B2* | 2/2012 | Stevenson et al. | 340/10.1 |
| 8,572,305 B2* | 10/2013 | Weddingfeld et al. | 710/110 |
| 8,674,808 B2* | 3/2014 | Jantunen et al. | 340/10.3 |
| 2001/0028297 A1* | 10/2001 | Hara et al. | 340/5.62 |
| 2004/0008467 A1* | 1/2004 | Calandre et al. | 361/119 |
| 2005/0083174 A1* | 4/2005 | Nakamura et al. | 340/5.72 |
| 2007/0076863 A1* | 4/2007 | Schiffmann et al. | 380/28 |
| 2009/0043939 A1 | 2/2009 | Fuessl et al. | |
| 2009/0167536 A1* | 7/2009 | Clark et al. | 340/573.4 |

OTHER PUBLICATIONS

Ming et al. Fault Location System for Safety Monitoring Based on CAN Bus. IEEE. 2009.*
He-huan et al. Design of CAN Bus and Wireless Sensor Based Vehicle Tire Pressure Monitoring System. 2012.*
International Preliminary Report on Patentability; Application No. PCT/EP2010/068002; Issued: Feb. 2, 2012; 7 pages.
International Search Report & Written Opinion of the International Searching Authority; Application No. PCT/EP2010/068002; Issued: Apr. 14, 2011; Mailing Date: Apr. 21, 2011; 12 pages.

* cited by examiner

SAFETY ARRANGEMENT

CROSS-REFERENCE TO RELATED APPLICATIONS

The present application is a continuation of International patent application PCT/EP2010/068002 filed on Nov. 23, 2010 which designates the United States and claims priority from Swedish patent application 0950696-5 filed on Sep. 23, 2009. The content of all prior applications is incorporated herein by reference.

FIELD OF THE INVENTION

The present invention relates to safety devices in general and monitoring devices in particular.

BACKGROUND OF THE INVENTION

The automation of industrial sites implies major safety considerations. AS-i (Actuator Sensor Interface) Safety, for example, the safety-oriented extension of AS-Interface, facilitates the standard operation of standard and safety sensor technology in a joint bus connection that has all the well-known system advantages of AS-Interface. Since the year 2000 AS-i Safety has been certified as a reliable bus system for applications up to Category 4 (EN 954-1)by the TÜV-Nord of the Berufsgenossenschaftliches Institut für Arbeitssicherheit.

Normally, for example when a gate is monitored in a safety system, a sensor for generating a signal for at least two positions is connected to a bus and the status of the sensor (open gate, closed gate) is evaluated, and if there are no errors, the sensor generates a message that it is in correct position.

Figure 5:
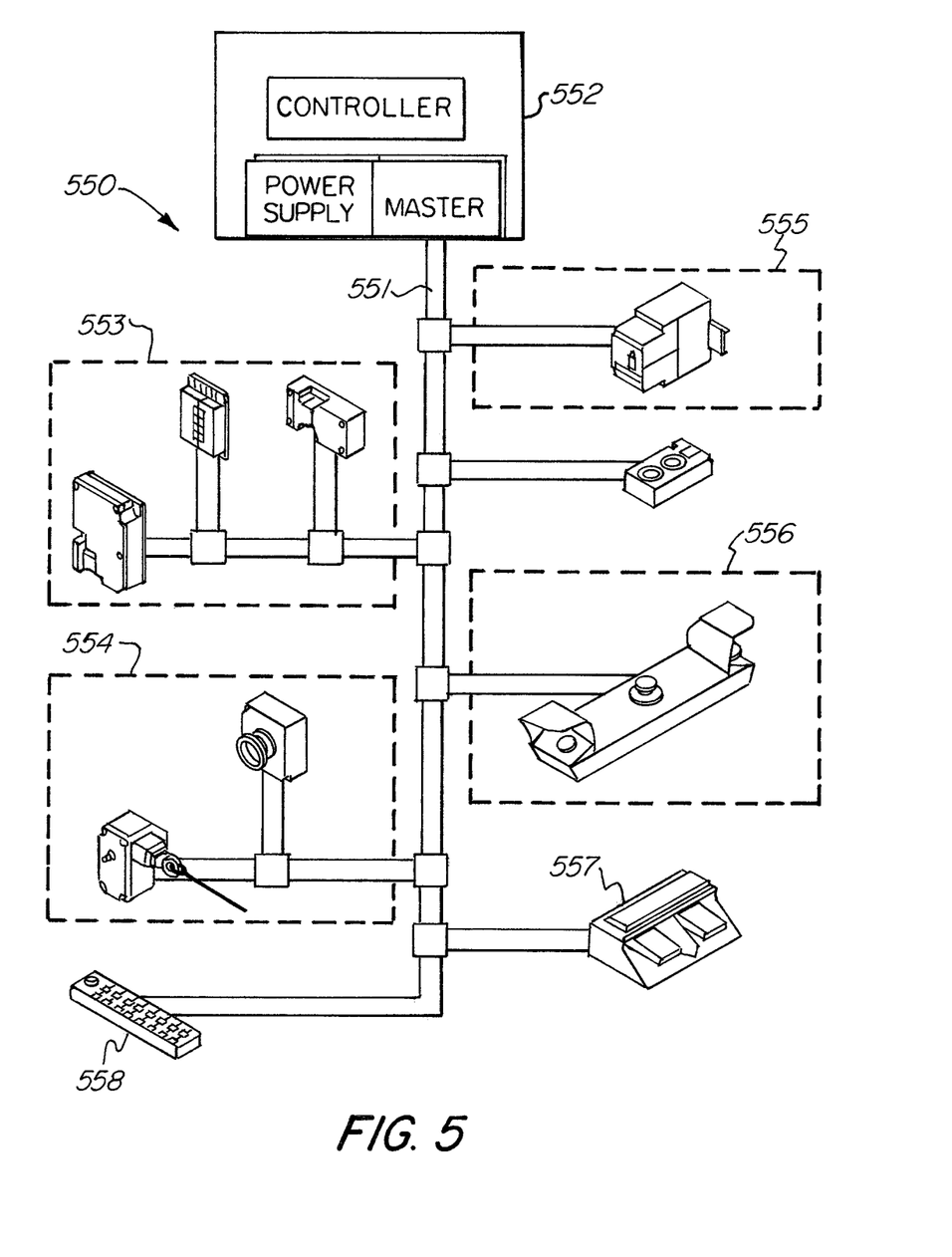
FIG. 5 is a schematic monitoring system.

FIG. 5 illustrates a safety monitoring system 550 comprising: a common bus 551, such as AS-i bus, a controller 552 comprising a power supply and a driver/master, and number of monitored devices and sensors (not all illustrated), such as non-contact sensors 553, interlocking devices, magnetic switches, stops 554, emergency grab wire switch with dual switching, three-position devices, relays 555, two-hand control devices 556, foot operated switches 557, safety contact rails, bumpers, mats, fencing system, safety roller doors, etc.

WO 03/093999 discloses an inherently fail-safe processing, having two processing units: a first processing unit with a first data processor and/or controller; at least one input port for input data received from at least one remote unit; at least one output port for output data to be transmitted to at least one remote unit. The first processing unit comprises means for generating a unique code for functional control of the processing and/or receiving and/or transmitting steps being performed and a port for the transmission of the generated checkwords. A functional checker and protection unit is provided, which consists of a second inherently fail-safe processing unit, which executes a program for checking the functional steps of the first processing unit and a program for checking the correctness of functional control codes and the time sequence thereof. The checker and protection unit communicates with the first processing unit and generates signals for enabling it when check-words are correct, and signals for disabling the first processing unit and/or for forcing the transmission of predetermined output data for fail-safe remote unit control, or generates itself predetermined output data for fail-safe remote unit control and/or enables/disables vital functions of the remote unit and/or of the first processing unit.

SUMMARY OF THE INVENTION

The present invention aims to provide a new way of using control arrangement for enhancing security monitoring.

For this reason a monitoring system is provided comprising a first and a second portion. The first portion comprises a controller for providing a set of codes and is configured to connect said system to a common data bus. The first portion is configured to provide a synchronization signal to said second portion, which comprises a controller for replaying a code sequence to said first portion. The first portion is further configured to output said code sequence from said second portion for verification by a verification entity. Preferably, but not exclusively, the bus is an AS-i bus. The first portion comprises a logic for comparing said set of codes. In one embodiment, the second portion comprises at least one micro processor and a transceiver. The first portion may comprise at least one micro processor, a bus driver and a transceiver. The system is configured to monitor one or several of non-contact sensors, interlocking devices, magnetic switches, stops, emergency grab wire switch with dual switching, three-position devices, two-hand control devices, foot operated switches, Safety contact rails, bumpers, mats, fencing system and safety roller doors. Preferably the synchronization signal is a synchronization pulse.

The invention also relates to a device for use in a safety controlling arrangement. The device comprises a transceiver, a microprocessor MCU, and a bus driver. The transceiver and MCU are connected and communicate by a transceiver sending a synchronization signal and said MCU replying with a code line. The MCU communicates with the bus driver by receiving a synchronization signal and sending a code line. The device is configured to receive a synchronization signal from the bus driver and transmit said synchronization signal by means of said transceiver and receive a code sequence by said transceiver for verification and or transmission for further verification. The device may further comprise a monitoring logic for controlling said received code sequence. The transceiver may communicate using radio, IR or similar communication medium.

The invention also relates to a safety device comprising a transceiver and a microprocessor MCU. The transceiver and MCU are connected and communicate by a transceiver sending a synchronization signal and said MCU replying with a code sequence. The MCU is further configured to upon reception of said synchronization signal to generate said code sequence and provide it to the transceiver for transmission. In one embodiment the synchronization signal is received externally. In one embodiment the code sequence is transmitted to an external device. The transceiver may communicate with a corresponding transceiver using radio, IR or similar communication medium.

BRIEF DESCRIPTION OF THE DRAWINGS

The present invention will hereinafter be further explained by means of non-limiting examples with reference to the appended figures where.

DETAILED DESCRIPTION OF THE INVENTION

According to the present invention, a sensor is divided in two parts. One part comprises an interface towards a data bus, e.g. used for transmitting security related information and the second part comprises a verification part and comprising information in the form of the output messages from the sensor. When the two parts are adjacent or in a predetermined position, the sensor will transmit a valid message, and when the position conditions are not fulfilled no valid messages are transmitted.

Figure 1:
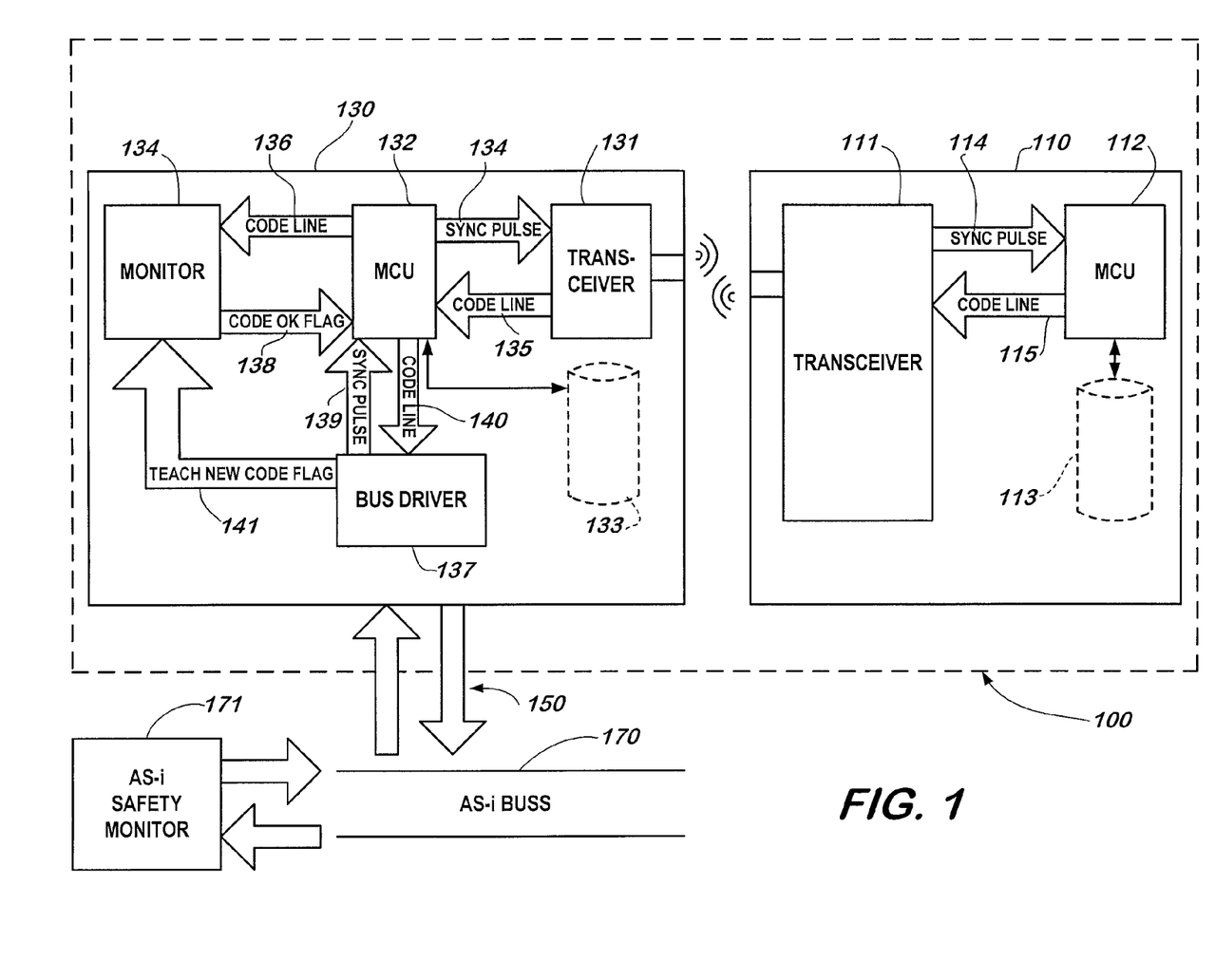
FIG. 1 shows schematically a first embodiment of a system according to the present invention.

The principle of the invention is illustrated in the first embodiment of FIG. 1. The arrangement 100 of the invention comprises a first portion 110 interface part, a second portion 130 base part, and connections 150 to an external bus.

The interface part 110 comprises a transceiver 111 and a microprocessor (MCU) 112 and a memory 113. The transceiver 111 and MCU 112 are connected and communicate by transceiver 111 sending a synchronization pulse 114 (sync pulse) and MCU replying with a code line 115. The memory 113 may, besides instructions for executing MCU operations, include a code table. The code table may be stored in an internal memory of the MCU 112 or the memory 113. The transceiver 111 communicates with a corresponding transceiver using radio, IR or similar communication means.

The base part 130 comprises a transceiver 131, a microprocessor (MCU) 132, a monitoring logic 134 and a bus driver 137. The transceiver 131 and MCU 132 are connected and communicate by MCU 132 sending a synchronization pulse 134 and transceiver 131 replying with a code line 135. MCU 132 communicates with the monitoring logic 134 by sending a code line 136 and receiving a code status 138. MCU 132 communicates with the bus driver 138 by receiving a synchronization pulse 139 and sending a code line 140. The bus driver 137 provides monitoring circuit with new code flags 141. The memory 143 may include instructions for executing MCU operations. The memory 143 may be an internal memory of the MCU 132. The transceiver 131 communicates with a corresponding transceiver using radio, IR or similar communication medium.

The arrangement 100 communicates with a common communication bus 170, which may be monitored and controlled with a bus controller 171.

In this case it is assumed that an AS-i bus is used, hence the bus driver 137, the bus 170 and the bus controller 171 are AS-i specific devices. The invention may of course be applied on any communication buses intended for security and monitoring applications, for example CAN.

The MCU 112 includes a code table, each line (e.g. 8 lines) of which comprises a number of bits, e.g. 4 bits. Preferably, the table is transmitted line by line from MCU 112 to the transceiver 111. The transceiver 111 transmits the received lines to the base device's transceiver 131, which provides each received line to MCU 132. The MSU 132 provides the obtained code to the monitoring logic 134, which controls the code with a corresponding safe code. If all lines are correct the monitoring logic 134 provides the MCU 132 with a validity code, which outputs the received line on the common bus 171. The safety depends on the fact that the base part 130 does not need to store the code and it cannot transmit the entire code table if it is not received from the interface part 110. The monitoring logic can only receive the code lines and provide a valid or non-valid signal if the code is evaluated correct compared with the code received from the bus controller 171.

In operation and with reference to AS-i standard, an AS-i safety code is pulled "line for line" from interface part 110 to base part 130 using the sync pulse. The synch pulse is used to synchronize both parts. To avoid critical errors in the safety monitor or controller 171, the code is first checked in the monitoring logic 134, or non-safety monitor. This reduces the risk of sending faulty safety codes resulting in, e.g. potential system lock down.

The non-safe monitor 134 will contain (e.g. stored in a memory) the safety code, but since it is only enabled to transmit one bit, "code ok flag" there is a limited risk that the code can be transmitted from the bus driver 137 to the AS-i buss 170.

The AS-i controller (bus driver) 137 sends the code table (line by line) to the non-safe monitor 134 received from the bus controller 171. It is possible, if a node address is set to zero. When "teach new code flag" 141 is received from the bus driver 137, the MCU 132 sends codes line by line. The non-safe monitor 134 "learns", i.e. stores new codes for compression and compares it with incoming code before it is transmitted on the bus.

In a safety application, e.g. for monitoring a gate or a door, the base part 130 may be assembled on a door frame while the interface part 110 is assembled on the gate or door. When the both parts are in a position that is consider as safe, the interface device transmits data that safety is achieved to the AS-i safety monitor.

Figure 2:
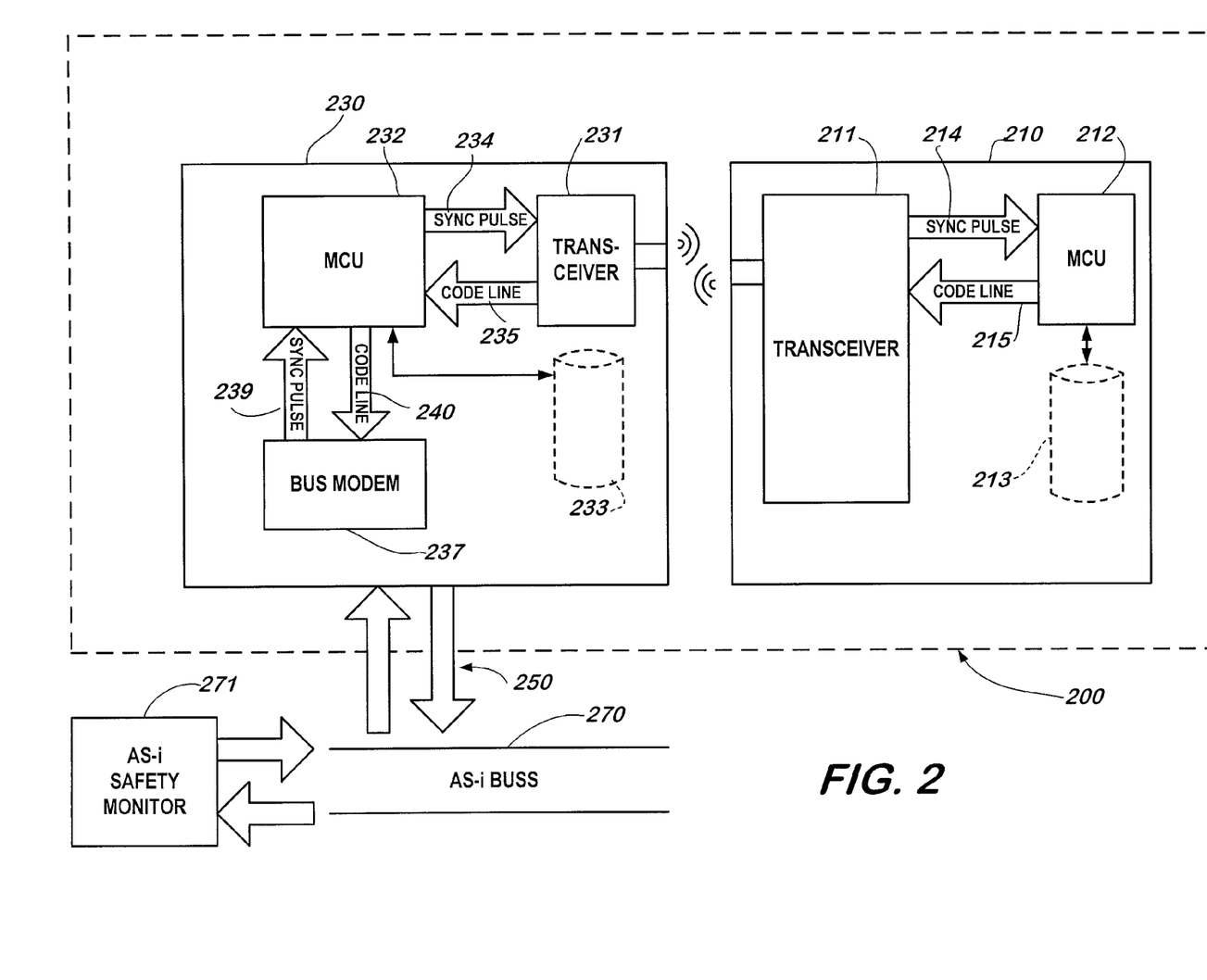
FIG. 2 shows schematically a second embodiment of a system according to the present invention.

FIG. 2 is a second, simplified embodiment of the invention. The arrangement 200 of the invention comprises a first part 210 interface, a second part 230 base, and connections 250 to an external bus as well.

The interface part 210 comprises a transceiver 211 and a micro-processor (MCU) 212 and a memory 213. The transceiver 211 and MCU 212 are connected and communicate by transceiver 211 sending a synchronization pulse 214 and MCU replying with a code line 215. The memory 213 may function as described above. The transceiver 211 communicates with a corresponding transceiver using radio, IR or similar communication means.

The base part 230 comprises a transceiver 231, a microprocessor (MCU) 232, and a bus driver 237. The transceiver 231 and MCU 232 are connected and communicate by transceiver 231 receiving a synchronization pulse 234 from MCU 232 and transceiver 231 sending a code line 235 to MCU 232. MCU 232 communicates with the bus driver 238 by receiving a synchronization pulse 239 and sending a code line 240.

The difference between the embodiments of FIG. 2 and FIG. 1 is that the embodiment of FIG. 1 comprises a "filter" which further reduces the risk for transmitting invalid messages over the bus which may cause operations disturbance. In this embodiment the MCU 232 functions as a filter and validities the code line instead of the monitor 134. The code is not stored in the memory and the code lines are validated line by line. In one embodiment, for example Manchester code may be used for transmission between the parts and the code line may be transmitted several times for validation.

The arrangement 200 communicates with a communication bus 270, which may be monitored and controlled with a bus controller 271.

Also in this case it is assumed that the bus is an AS-i bus, and the bus driver 237, the bus 270 and the bus controller 271 are AS-i specific devices.

Figure 3:
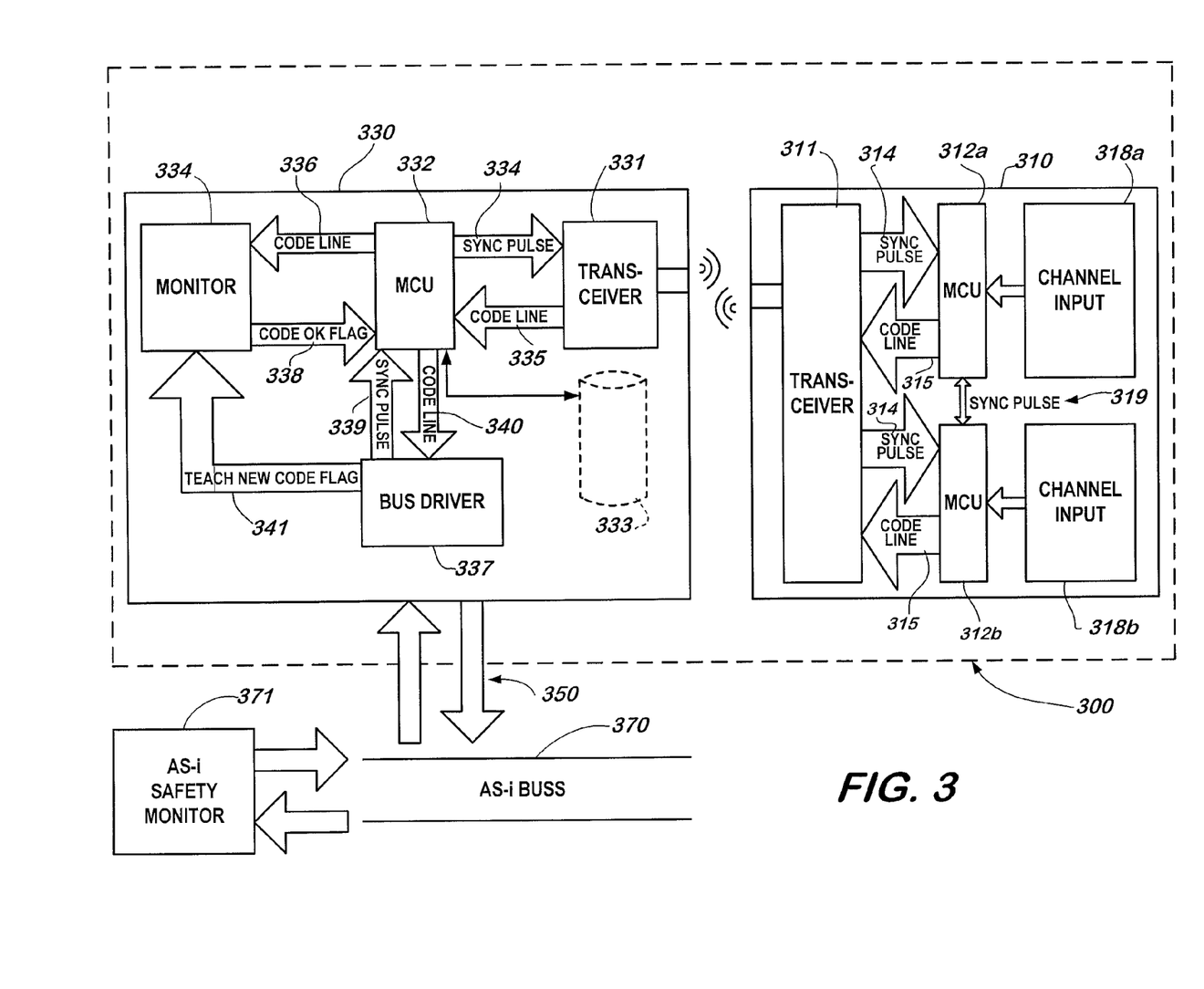
FIG. 3 shows schematically a third embodiment of a system according to the present invention.

In operation an AS-i safety code is pulled from the interface part 210 to the base part 230 using the sync pulse, as described earlier. The synch pulse synchronizes both parts. FIG. 3 is yet another embodiment of a safety arrangement 300 according to the invention, comprising a first portion 310 interface, a second portion 330 base, and connections 350 to an external bus 370.

The interface part 310 comprises a transceiver 311, at least two microprocessors (MCU) 312a and 312b and at least two channel inputs 318a and 318b. The transceiver 311 and MCUs 312*a* and 312*b* are connected and communicate by transceiver 311 sending a synchronization pulse 314 and MCUs replying with a code line 315 (from each MCU). The channel inputs 318*a*/318*b* may be connected to other monitored devices (not shown), such as non-contact sensors, interlocking devices, magnetic switches, stops, emergency grab wire switch with dual switching, three-position devices, two-hand control devices, foot operated switches, Safety contact rails, bumpers, mats, fencing system and safety roller doors, etc. In this case partial code tables are stored for each MCU 312*a* and 312*b* and both must generate same decision, i.e. data output, so that a correct active signal is output on the bus 370. Both MCUs are synchronized with same synch pulse 319.

Again a memory (not shown) may be present, which beside instructions for executing MCU operations includes a code table. The transceiver 311 communicates with a corresponding transceiver using radio, IR or similar communication means.

The base part 330 comprises a transceiver 331, a microprocessor (MCU) 332, a monitoring logic 334 and a bus driver 337. The transceiver 331 and MCU 332 are connected and communicate by MCU 332 sending a synchronization pulse 334 and transceiver 331 by replying with a code line 335. MCU 332 communicates with the monitoring logic 334 by sending a code line 336 and receiving a code status 338. MCU 332 communicates with the bus driver 337 by receiving a synchronization pulse 339 and sending a code line 340. Bus driver 337 provides monitoring circuit with new code flags 341. The memory 333 may include instructions for executing MCU operations. The memory 333 may be an internal memory of the MCU 332. The transceiver 331 communicates with a corresponding transceiver using radio, IR or similar communication means.

The arrangement 300 communicates with the communication bus 370, which may be monitored and controlled with a bus controller 371. In this case it is assumed that an AS-i bus is used, hence the bus driver 337, the bus 370 and the bus controller 371 are AS-i specific devices. The invention may of course be applied on any communication bus intended for security and monitoring applications.

In operation and with reference to AS-i standard, an AS-i safety code is pulled "line for line" from the interface part 310 to the base part 330 using the sync pulse. The synch pulse synchronizes both parts. To avoid critical errors in the safety monitor or controller 371, the code is first checked in the monitoring circuit 334, or non-safety monitor. The non-safe monitor 334 will contain the safety code, but since is only enabled transmitting one bit, "code ok flag," there is a limited risk that the code can be transmitted from the bus driver 337 to the AS-i buss 370.

The embodiment of FIG. 3 is specially advantaged for applications in which a monitored device is distanced from the monitoring arrangement and a signal from the device must be transmitted a longer distance. It may also be used for wireless transmissions.

Figure 4:
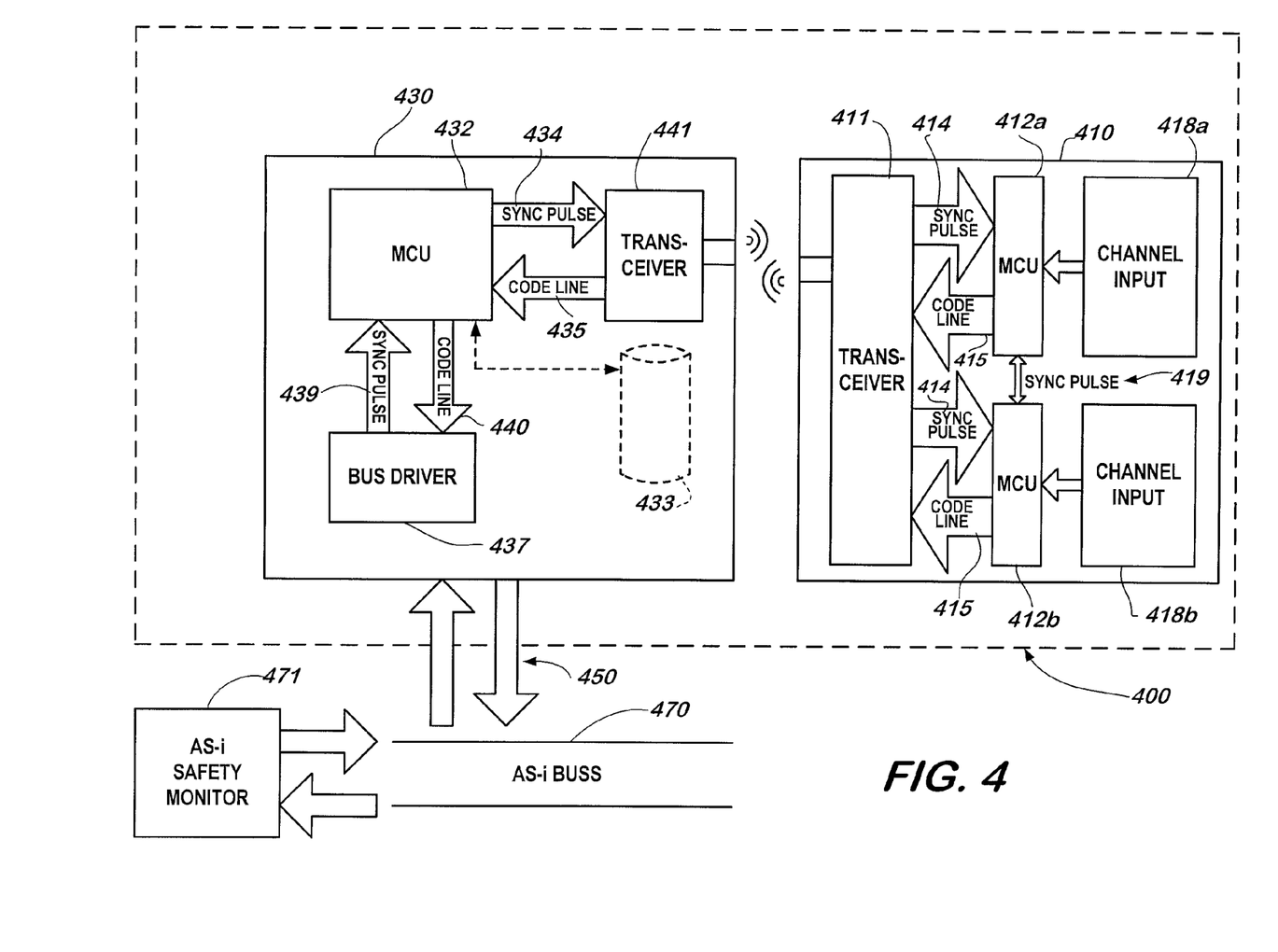
FIG. 4 shows schematically a fourth embodiment of a system according to the present invention.

FIG. 4 is yet another embodiment of a safety arrangement 400 according to the invention, comprising a first portion 410 interface part, a second portion 430 base part, and connections 450 to an external bus 470.

The interface part 410 comprises a transceiver 411, at least two microprocessors (MCUs) 412*a* and 412*b* and at least two channel inputs 418*a* and 418*b*. The transceiver 411 and MCUs 412*a*/412*b* are connected and communicate by transceiver 411 sending a synchronization pulse 414 and MCUs reply with a code line 415. The channel inputs 418*a*/418*b* may be connected to other monitored devices (not shown), such as non-contact sensors, interlocking devices, magnetic switches, stops, emergency grab wire switch with dual switching, three-position devices, two-hand control devices, foot operated switches, Safety contact rails, bumpers, mats, fencing system and safety roller doors, etc. In this case partial code tables are stored for each MCU 412*a* and 412*b* and both must generate same decision, i.e. data output, so that a correct active signal is output on the bus 470. Both MCUs are synchronized with same synch pulse 419.

The base part 430 comprises a transceiver 441, a microprocessor (MCU) 432, and a bus driver 437. The transceiver 441 and MCU 432 are connected and communicate by MCU 432 sending a synchronization pulse 434 and transceiver 431 replying with a code line 435. MCU 432 communicates with the bus driver 437 by receiving a synchronization pulse 439 and sending a code line 440. The memory 433 may include instructions for executing MCU operations. The memory 433 may be an internal memory of the MCU 432. The transceiver 441 communicates with a corresponding transceiver using radio, IR or similar communication means.

In this case MCU 432 decides the validity of the received code lines.

In one embodiment, the interface portion may comprise a passive unit such as RFID which is energized by the transmitter of the bus antenna unit. In this case the synchronization may be carried out when the interface is energized.

Generally, each unit may be provided with an internal clock and each synchronized by reception of a synchronization signal instead of synchronization pulse.

Figure 6:
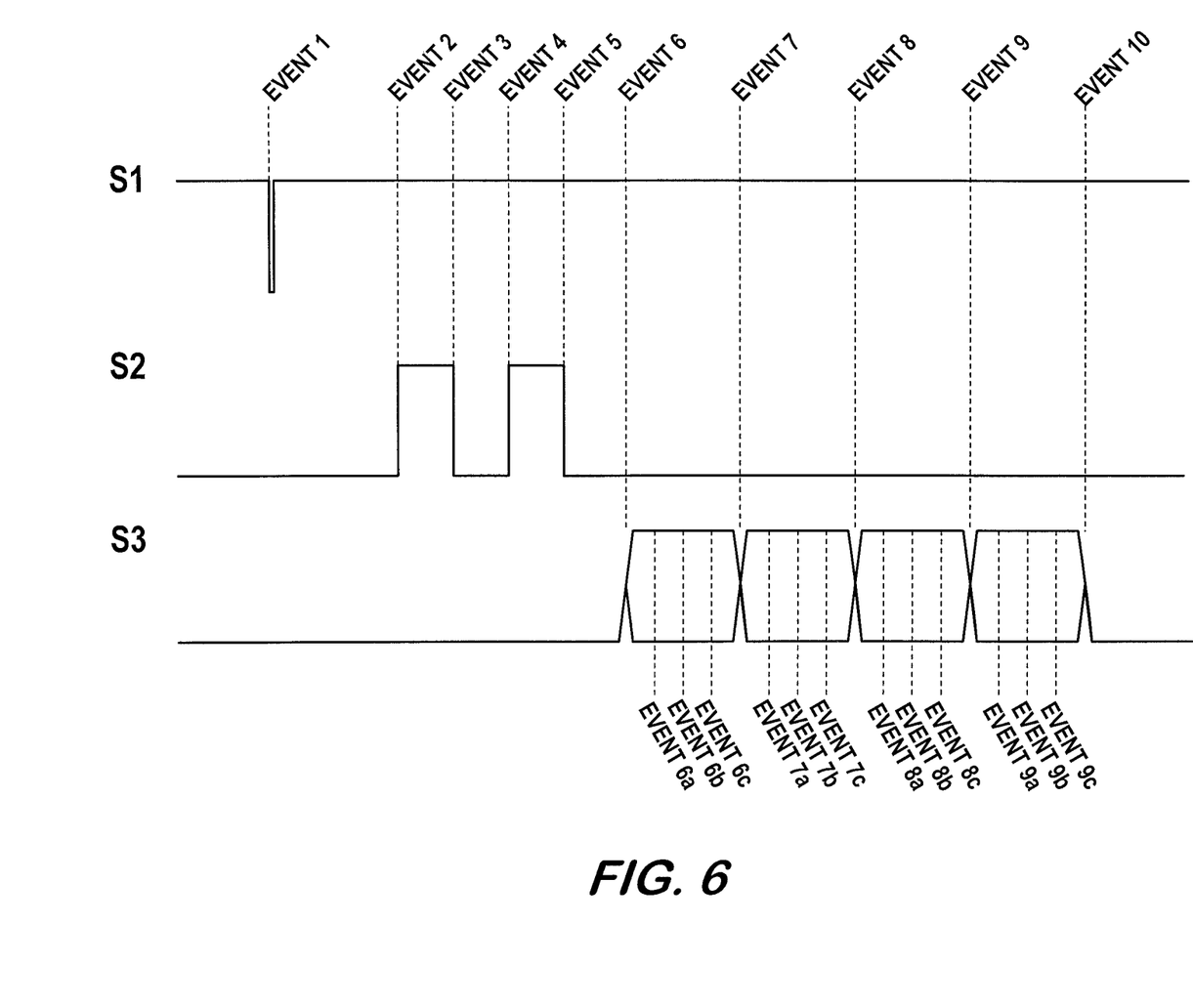
FIG. 6 is a timing diagram according to one exemplary embodiment.

FIG. 6 illustrates a timing diagram for communication between the base part (330, 430) and interface part (310, 410). S1 designates signal from the base part to safety monitor, S2 is the signal from base part to interface part and S3 is response from interface part to base part. The signals comprise (each "Event" designates one edge of a pulse):

Event 1: Synchronization pulse provided to the microcontroller from the bus driver (371, 471), Event 2-3 and 4-5: The base part transmits one or several synchronization pulses to the interface part. The number of synchronization pulses may depend on the safety monitor asking for a retransmission or a new response code (usually four bits), Events 6-10: The interface part transmits a code (usually four bits) from its code table (may be 32 bits), which is received by the base parts controller.

Events 6*a*-6*c*, 8*a*-8*c* and 9*a*-9*c* are the occasions that the controller samples the incoming codes to transmit the code at the next synchoronization S1 to the safety monitor via the bus.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be implemented at least in part by means of both hardware and software, and that several "means", "units" or "devices" may be represented by the same item of hardware. The terms base and interface do not limit the units to a specific functionality.

The above mentioned and described embodiments are only given as examples and should not be limiting to the present invention. Other solutions, uses, objectives, and functions within the scope of the invention as claimed in the below described patent claims should be apparent for the person skilled in the art.

What is claimed is:

1. A monitoring system comprising:
a base part having a base controller, said base part connected to a common data bus;
an interface part having an interface controller for receiving a synchronization pulse from said base part when said base part and said interface part are in a predetermined position;
said interface controller receiving the synchronization pulse and providing a code set having a code sequence to said base part, the code set including multiple lines of code and the code set is transmitted according to the synchronization pulse; and
said base controller outputting said code sequence for verification by a verification entity.

2. The system of claim 1, wherein said bus is an AS-i bus or a CAN bus.

3. The system of claim 1, wherein the base part comprises a logic for comparing said code sequence to a stored code sequence.

4. The system according to claim 1, wherein said interface part comprises at least one microprocessor and a transceiver.

5. The system according to claim 1, wherein said base part comprises at least one microprocessor, a bus driver and a transceiver.

6. The system according to claim 1, wherein said base part is connected to monitor one or several of non-contact sensors, interlocking devices, magnetic switches, stops, emergency grab wire switch with dual switching, three-position devices, two-hand control devices, foot operated switches, safety contact rails, bumpers, mats, fencing system and safety roller doors.

7. The system according to claim 1, wherein said predetermined position is when the base part and the interface part are adjacent to each other.

8. The system according to claim 1, wherein the interface part will transmit a valid message in said predetermined position, and when predetermined position conditions are not fulfilled no valid messages are transmitted.

9. The system of claim 1, wherein said code set comprises a first code set, said system further comprising a second code set having a code sequence and multiple lines of code, and wherein the verification entity compares the multiple lines of code of the first code set with the multiple lines of code of the second code set.

10. A device for use in a safety controlling arrangement, said device comprising:
a first transceiver;
a microprocessor (MCU) connected to said first transceiver; and
a bus driver connected to said MCU;
said first transceiver adapted to communicate with a second transceiver by sending a synchronization pulse to the second transceiver, said MCU communicating with the bus driver by receiving a synchronization pulse from the bus driver and sending a code line to the bus driver;
wherein when said device is in a predetermined position, said first transceiver sends the synchronization pulse to the second transceiver and said first transceiver receives a code sequence from the second transceiver for verification and/or transmission for further verification;
wherein the code sequence includes multiple lines of code and the code sequence is transmitted according to the synchronization pulse.

11. The device of claim 10, further comprising a monitoring logic for controlling said received code sequence.

12. The device of claim 10, wherein said first transceiver communicates using radio signal, Infra Read (IR) or similar communication medium.

13. A safety device comprising:
a second transceiver; and
a microprocessor (MCU) connected to said second transceiver;
said second transceiver adapted to communicate with a first transceiver by receiving a synchronization pulse from the first transceiver; and
wherein when the device is in a predetermined position, said second transceiver receives the synchronization pulse from the first transceiver and second transceiver transmits the synchronization pulse to said MCU, and said MCU transmits a code sequence to said second transceiver for transmission to the first transceiver;
wherein the code sequence includes multiple lines of code and the code sequence is transmitted according to the synchronization pulse.

14. The safety device of claim 13, wherein said synchronization pulse is received externally.

15. The safety device of claim 13, wherein said code sequence is transmitted to an external device.

16. The safety device of claim 13, wherein the transceiver communicates with a corresponding transceiver using radio, IR or similar communication medium.

* * * * *